(12) United States Patent
Arrighi

(10) Patent No.: US 9,924,639 B1
(45) Date of Patent: Mar. 27, 2018

(54) TEMPERATURE CONTROL STRUCTURE FOR INDOOR GARDENS

(71) Applicant: Chandler A. Arrighi, Sacramento, CA (US)

(72) Inventor: Chandler A. Arrighi, Sacramento, CA (US)

( * ) Notice: Subject to any disclaimer, the term of this patent is extended or adjusted under 35 U.S.C. 154(b) by 231 days.

(21) Appl. No.: 14/968,996

(22) Filed: Dec. 15, 2015

(51) Int. Cl.
  *G05D 23/00* (2006.01)
  *A01G 9/24* (2006.01)
  *A01G 31/02* (2006.01)

(52) U.S. Cl.
  CPC ............. *A01G 9/246* (2013.01); *A01G 31/02* (2013.01)

(58) Field of Classification Search
  CPC .... A01G 9/246; A01G 9/1407; A01G 9/1415; A01G 9/24; A01G 9/245; A01G 31/02; A01G 31/08; A01G 2009/1461; A01G 2009/1453; F28D 7/02; F28D 7/028
  See application file for complete search history.

(56) References Cited

U.S. PATENT DOCUMENTS

| | | | |
|---|---|---|---|
| 1,952,269 A | 3/1934 | Lundquist | |
| 3,245,461 A * | 4/1966 | Allington | A01G 9/00 165/228 |
| 4,484,563 A | 11/1984 | Fritz | |
| 4,577,435 A * | 3/1986 | Springer | A01G 9/24 248/68.1 |
| 4,699,316 A * | 10/1987 | Johnson | A01G 9/24 126/92 AC |
| 4,818,259 A | 4/1989 | Marano | |
| 5,046,331 A * | 9/1991 | O'Neal | F24F 5/0035 165/163 |
| 5,048,228 A * | 9/1991 | Neveu | A01G 9/1438 47/29.1 |
| 5,188,288 A * | 2/1993 | DeMerritt | A01G 9/245 126/91 A |
| 5,509,946 A | 4/1996 | Chu | |
| 7,025,812 B2 | 4/2006 | Marusic | |
| 7,368,003 B2 | 5/2008 | Crapser | |
| 7,387,664 B2 | 6/2008 | Kim | |
| 8,443,546 B1 | 5/2013 | Darin | |
| 2006/0179866 A1* | 8/2006 | Ting | F25B 39/04 62/305 |
| 2012/0096883 A1* | 4/2012 | Taysan | A01G 9/246 62/185 |

FOREIGN PATENT DOCUMENTS

CN 2664758 Y 12/2004

* cited by examiner

*Primary Examiner* — Travis Ruby

(57) ABSTRACT

The temperature control structure for indoor gardens is a temperature controlled space that protects plants from heat stress. The temperature control structure for indoor gardens is a water cooled structure. A plurality of fans are also provided to provide air flow through the structure. The temperature control structure for indoor gardens comprises a cooling structure and a basin.

9 Claims, 4 Drawing Sheets

US 9,924,639 B1

TEMPERATURE CONTROL STRUCTURE FOR INDOOR GARDENS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of temperature control devices, more specifically, a temperature controlled structure adapted for use in indoor gardening.

SUMMARY OF INVENTION

The temperature control structure for indoor gardens is a temperature-controlled space that absorbs the heat emission produced from indoor heat lamps. The temperature control structure for indoor gardens is a water-cooled structure. A plurality of fans is also provided to provide air flow through the structure.

These together with additional objects, features and advantages of the temperature control structure for indoor gardens will be readily apparent to those of ordinary skill in the art upon reading the following detailed description of the presently preferred, but nonetheless illustrative, embodiments when taken in conjunction with the accompanying drawings.

In this respect, before explaining the current embodiments of the temperature control structure for indoor gardens in detail, it is to be understood that the temperature control structure for indoor gardens is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the temperature control structure for indoor gardens.

It is therefore important that the claims be regarded as including such equivalent construction insofar as they do not depart from the spirit and scope of the temperature control structure for indoor gardens. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
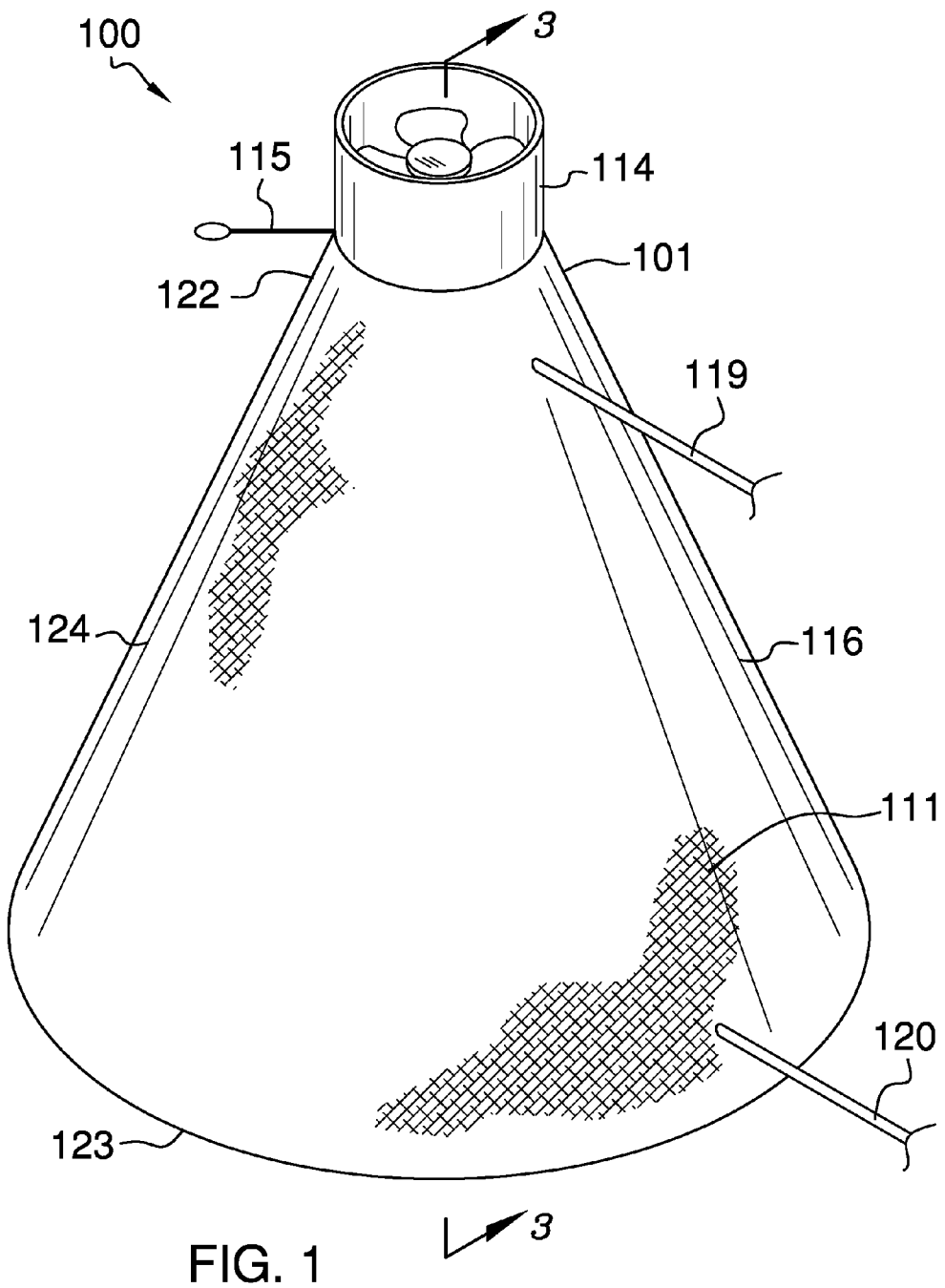
FIG. 1 is a perspective view of an embodiment of the disclosure.
Figure 2:
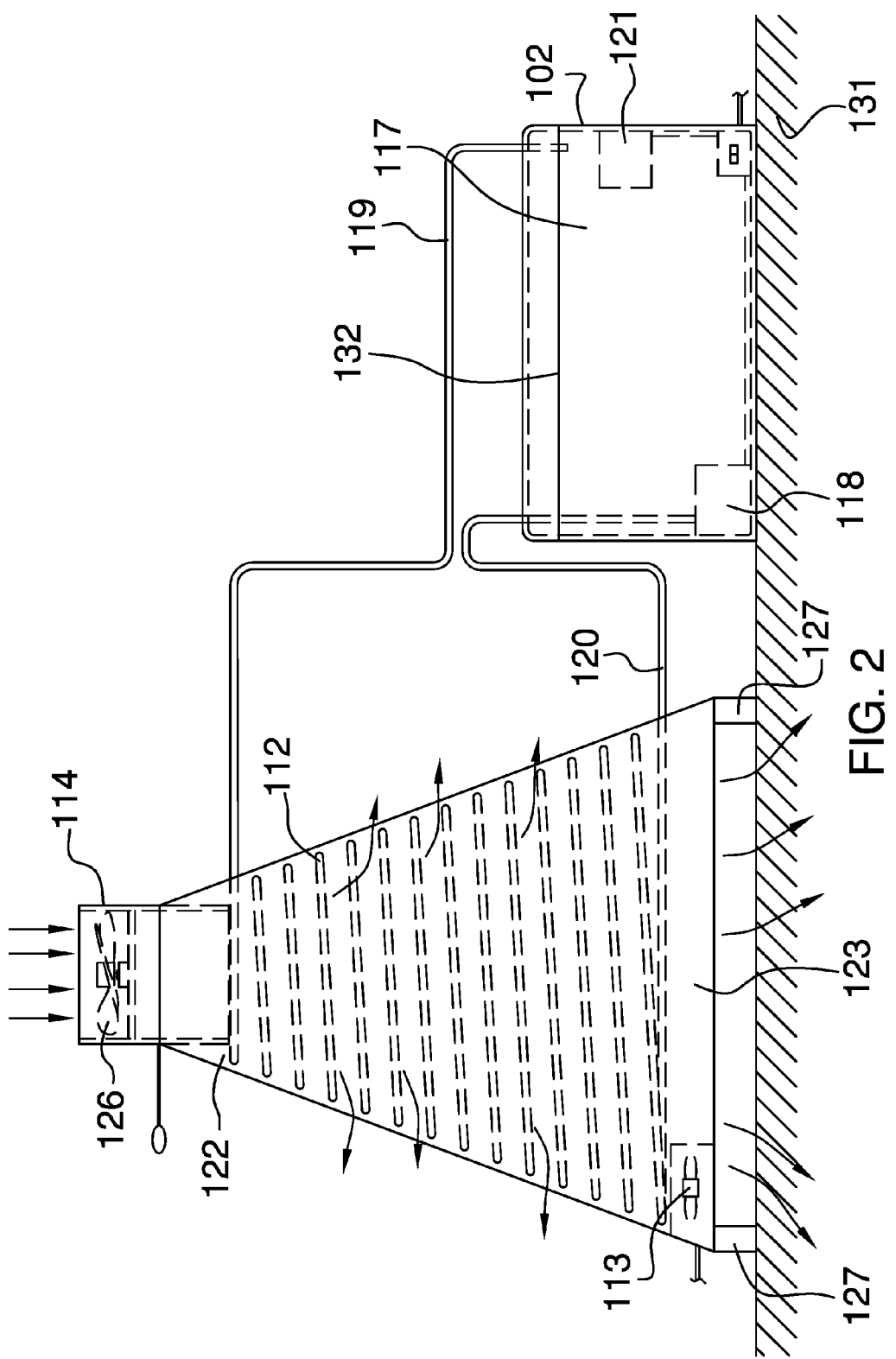
FIG. 2 is a schematic view of an embodiment of the disclosure.
Figure 3:
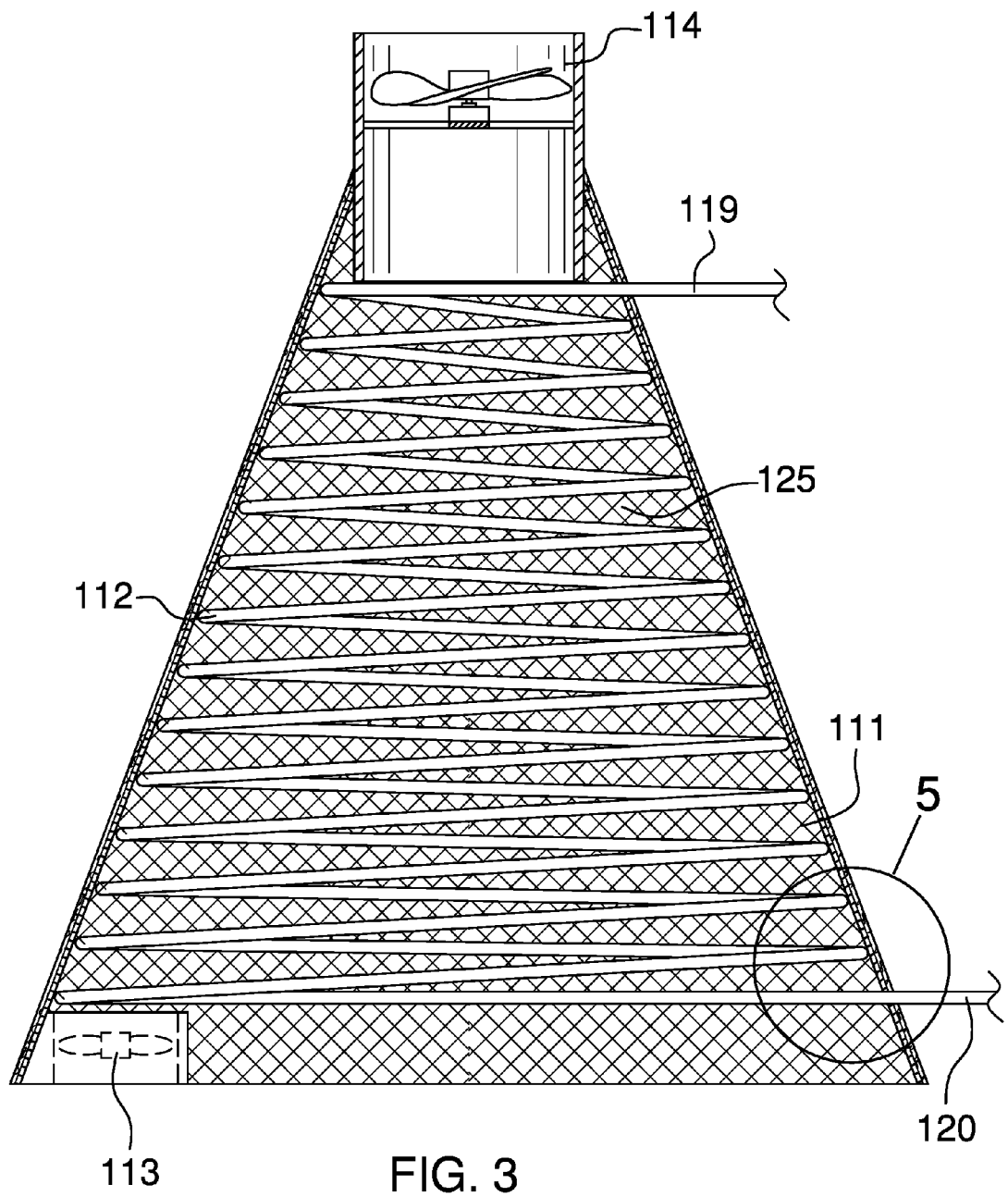
FIG. 3 is a cross-sectional view of an embodiment of the disclosure across 3-3.
Figure 4:
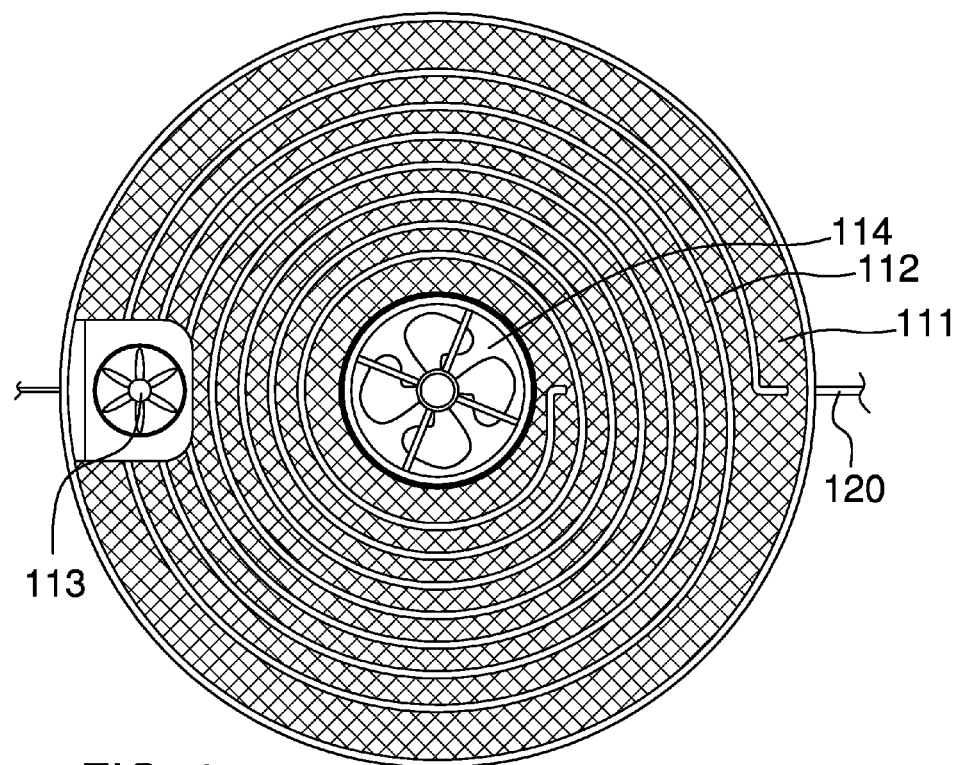
FIG. 4 is a bottom view of an embodiment of the disclosure.
Figure 5:
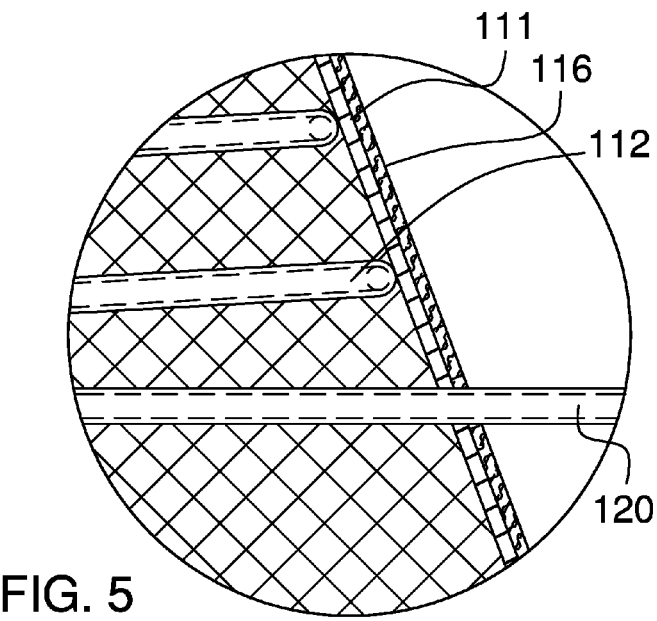
FIG. 5 is a detail view of section 5 of an embodiment of the disclosure.

Detailed reference will now be made to a first potential embodiment of the disclosure, which is illustrated in FIGS. 1 through 5. The temperature control structure for indoor gardens 100 (hereinafter invention) comprises a cooling structure 101 and a basin 102.

The cooling structure 101 further comprises a screen 111, a helical coil 112, an exhaust fan 113, an intake vent 114, an intake fan 126, a thermostat 115, a plurality of legs 127, and an optional textile cover 116. The helical coil 112 and the screen 111 act as the frame upon which the cooling structure 101 is built. The helical coil 112 is a pipe that is configured in the shape of a helical cone. The function of the helical coil 112 is to conduct cooling water 132 from the basin 102 through the interior 125 of the cooling structure 101 so that the cooling water 132 can cool the interior 125 of the cooling structure 101. The helical coil 112 is further defined with two ends called the water outlet 120 and the water intake 119. The water outlet 120 is the end of the helical coil 112 that draws cooling water 132 from the basin 102 (the water outlet 120 is named from the perspective of the basin 102).

The water outlet 120 is technically not a part of the helical cone that makes up the helical coil 112 but is considered a part of the helical coil 112. The water intake 119 is the end of the helical coil 112 that returns the cooling water 132 to the basin 102 (the water intake 119 is named from the perspective of the basin 102). The water intake 119 is technically not a part of the helical cone that makes up the helical coil 112 but is considered a part of the helical coil 112. The helical coil 112 is further defined with a top end 122 and a bottom end 123. The bottom end 123 is the end of the helical coil 112 that is closest to the resting surface 131 upon which the invention 100 is placed. The top end 122 is the end of the helical coil 112 is that is distal to the resting surface 131 upon which the invention 100 is placed. The radius of the helical coil 112 at the bottom end 123 is greater than the radius of the helical coil 112 at top end 122. The screen 111 is a readily and commercially available mesh made of wire or fiberglass.

The plurality of legs 127 are used to support the cooling structure 101 and to raise the helical coil 112 above the resting surface 131 that the cooling structure 101 is placed on. Each of the plurality of legs 127 is attached to the helical coil 112. The screen 111 is wrapped around the exterior of the helical coil 112 to form the outer surface 124 of the cooling structure 101.

Inside the top end 122 of the helical coil 112 is placed the intake vent 114 and the intake fan 126. The intake vent 114 is a readily and commercially available HVAC duct that conducts air flow into the cooling structure 101. The intake fan 126 is a mechanical device that is used to generate air flow into and through the cooling structure. The intake fan 126 is a readily and commercially available duct fan. The exhaust fan 113 is a mechanical device that is used to generate air flow through the cooling structure 101. The exhaust fan 113 can be a readily and commercially available duct fan which is placed inside the intake vent 114 or can be an axial box fan that is attached to the helical coil 112. Depending on the design, an optional textile cover 116 can be placed over the screen 111. The optional textile cover 116 is a knitted or woven cloth that is air and water permeable. The purpose of the optional textile cover 116 would be both to act as a blanket that insulates the cooling structure 101 and to regulate the light that reaches the interior 125 of the cooling structure 101.

The basin 102 further comprises a container 117, a water pump 118, and a water chiller 121. The container 117 is a water tight reservoir that holds the cooling water 132. The purpose of the water chiller 121 is to cool the water in the container 117 to a previously determined temperature. The purpose of the water pump 118 is to pump the cooling water 132 out of the container 117, through the helical coil 112 and back into the container 117.

The thermostat 115 is a readily and commercially available thermostat. The purpose of the thermostat 115 is to monitor the temperature within the cooling structure 101. When the temperature within the cooling structure 101 rises above a first preset temperature, the thermostat 115 closes a switch that controls the water pump 118 to turn on the water pump 118. The water pump 118 pumps the cooling water 132 through the helical coil 112 until the temperature within the cooling structure 101 falls below a second preset temperature wherein the thermostat 115 opens the switch that controls the water pump 118 to turn off the water pump 118.

In the first potential embodiment of the disclosure, a readily and commercially available hydroponic chiller was used for the container 117 and the water chiller 121. A readily and commercially available 250 gallons per hour water pump was used for the water pump 118. The screen 111, exhaust fan 113, intake vent 114, thermostat 115 and optional textile cover 116 are readily and commercially available. Methods to wind a copper pipe are well known and documented in the art. The helical coil 112 was formed using by applying these methods to wind a copper pipe to a jig made of cast aluminum. The water intake 119 and the water outlet 120 are connected to the hydroponic chiller using commercially available plumbing fittings.

To use first potential embodiment of the disclosure, the invention 100 is placed on a resting surface 131 assembled as described above. One or more plants may then be placed in the interior 125 of the cooling structure. The thermostat 115 is set to the temperature that is desired within the cooling structure 101 and then the water pump 118 and the hydroponic chiller are turned on according to the manufacturer's instructions. As water flows through the helical coil 112, heat is transferred from the interior 125 of the cooling structure 101 to the cooling water thereby cooling the interior 125 of the cooling structure 101 to keep the cooling structure 101 at a suitable temperature.

The following definitions were used in this disclosure:

Duct: As used in this disclosure, a duct is a tube, pipe, canal or channel through which air is conducted or conveyed.

HVAC: As used in this disclosure, HVAC is an acronym for Heating Ventilation and Air Conditioning and is a general term that refers to the air handling technology used within buildings.

Pipe: As used in this disclosure, a pipe is a hollow cylindrical device that is used for transporting liquids and gasses. In this disclosure, the terms inner diameter of a pipe and outer diameter are used as they would be used by those skilled in the plumbing arts.

Screen: As used in this disclosure, a screen is a meshed structure made or wire or yarn that allows for the free flow of air but prevents larger objects from passing through the meshed structure.

Textile: As used in this disclosure, a textile is a material that is woven, knitted, or felted. Synonyms in common usage for this definition include fabric and cloth.

Thermostat: As used in this disclosure, a thermostat is a device that monitors the temperature of a space and that 1) operates a switch when the measured temperature exceeds or falls below a first preset temperature; and, 2) performs the opposite operation on the switch when the measured temperature falls below or exceeds a second preset temperature.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A temperature control structure comprising:
    a cooling structure and a basin;
    wherein the cooling structure is used with an indoor garden in order to remove heat emission generated therefrom;
    wherein the temperature control structure is cooled by water;
    wherein the temperature control structure maintains a predetermined temperature range within the interior of the cooling structure;
    wherein the cooling structure further comprises a screen, a helical coil, an exhaust fan, an intake fan, and an intake vent;

wherein the helical coil is a pipe that is configured in the shape of a helical cone;

wherein the helical coil conducts cooling water from the basin through the interior of the cooling structure;

wherein the helical coil is further defined with a water outlet and a water intake;

wherein the water outlet is the end of the helical coil that draws cooling water from the basin;

wherein the water intake is the end of the helical coil that returns the cooling water to the basin;

wherein the helical coil is further defined with a top end and a bottom end;

wherein the screen is wrapped around the exterior of the helical coil;

wherein the intake vent is placed at the top end of the helical coil.

2. The temperature control structure according to claim 1 wherein the exhaust fan is a duct fan;

wherein the intake fan is a duct fan.

3. The temperature control structure according to claim 1 wherein the exhaust fan is an axial box fan;

wherein the intake fan is a duct fan.

4. The temperature control structure according to claim 1 wherein the cooling structure further comprises a thermostat.

5. The temperature control structure according to claim 4 wherein the cooling structure further comprises a textile cover.

6. The temperature control structure according to claim 5 wherein the textile cover is a knitted or woven cloth that is air and water permeable.

7. The temperature control structure according to claim 6 wherein the textile cover is placed over the screen.

8. The temperature control structure according to claim 4 wherein the basin further comprises a container, a water pump, and a water chiller.

9. The temperature control structure according to claim 8 wherein the thermostat controls the operation of the water pump.

\* \* \* \* \*